Aug. 21, 1923.

M. J. B. BARBAROU 1,465,294

COUPLING DEVICE FOR VEHICLES

Filed Sept. 29, 1921

INVENTOR:
Marius Jean Baptiste Barbarou

By *Otto Munk* his ATTORNEY.

Patented Aug. 21, 1923.

1,465,294

UNITED STATES PATENT OFFICE.

MARIUS JEAN BAPTISTE BARBAROU, OF PARIS, FRANCE.

COUPLING DEVICE FOR VEHICLES.

Application filed September 29, 1921. Serial No. 504,138.

*To all whom it may concern:*

Be it known that I, MARIUS JEAN BAPTISTE BARBAROU, citizen of the French Republic, residing at Paris, in the Republic of France, have invented new and useful Improvements in Coupling Devices for Vehicles, of which the following is a specification.

This invention relates to a device for coupling vehicles taken in tow, which is characterized more especially in this that it comprises a plate provided with a socket or shoulder in which an axle carried by the vehicle taken in tow can rotate without being capable of sliding, the said plate being resiliently supported by the frame of the main vehicle, owing to springs which are tensioned and arranged on each side of the said plate, attached to its ends and to the chassis of the vehicle.

In the accompanying drawings, and by way of example:

Figure 1:
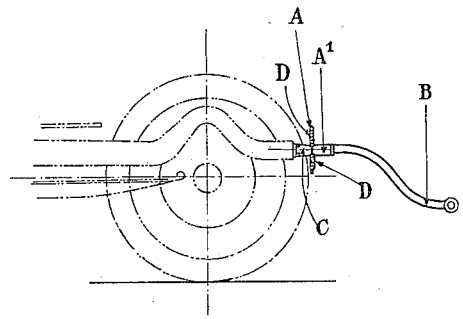
Fig. 1 is a side elevation of a coupling device according to the present invention fixed to the rear of a motor-car vehicle.
Figure 2:
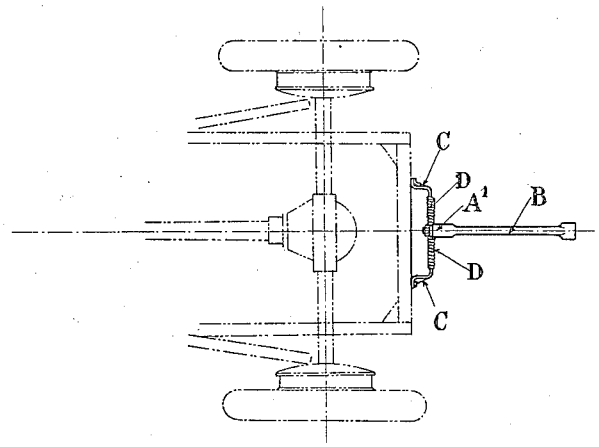
Fig. 2 is a corresponding plan view.

As shown in the drawings, the coupling device according to the present invention consists of a plate A having a sleeve portion or socket $A^1$ in which penetrates an axle which forms the end of a lever or draw bar B carried by the vehicle which is taken in tow.

This axle is prevented from moving axially with respect to the sleeve $A^1$ but can rotate inside the latter.

Figure 3:
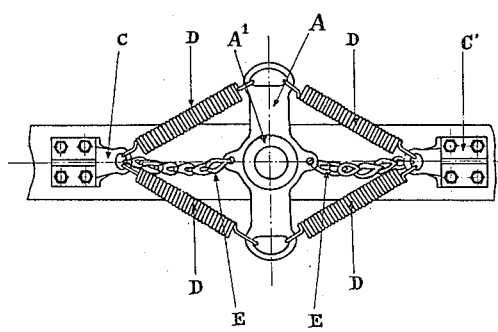
Fig. 3 is a front elevation on a larger scale.
Figure 4:
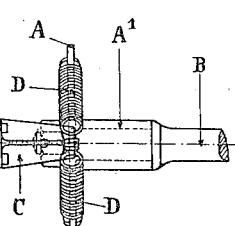
Fig. 4 is a corresponding side elevation on the same scale.

The plate A (Figs. 3 and 4) is connected to two brackets C fixed to the chassis of the motor vehicle, by means of four springs D and two safety chains E. Normally, the springs D are shorter than their length when in position, and they are considerably extended, when they are mounted. The tension due to this extension is such that the pulling effort of the vehicle taken in tow or of pressure in the case when brakes are applied produces a rather limited displacement of the plate A.

In the case when the vehicle taken in tow has a tendency to take an oblique position, it causes the sleeve $A^1$ to take an oblique direction, which produces an extension of the springs D, thus limiting the displacement. The oscillations in a vertical plane of the vehicle taken in tow are damped in a similar manner.

In the case when one of the springs D breaks, the coupling is ensured by the chains E which allow of reaching the garage where the necessary repairing may be effected.

Having now described my invention, what I claim as new and desire to secure by Letters Patent is:

1. In combination with the rear bar of a vehicle, brackets fixed to said rear bar, a plate having a sleeve therein for receiving the draw-bar of a trailer, coil springs at each side of said plate, said springs being attached at one end to said plate and at the other end to said brackets, said bracket holding said plate and springs spaced from said rear bar, said springs being under tension to hold said plate against substantial movement due to the movements of said trailer, the forward movement of said plate being limited by said rear bar.

2. In combination with the rear bar of a vehicle, brackets fixed to said rear bar, a plate extending above and below said rear bar and having a sleeve therein on a level with said bar for receiving the draw-bar of a trailer, coil springs at each side of said plate, said springs being attached at one end to the outer ends of said plate and converging to the bracket on the respective side, the other end of said springs being attached to said brackets, said bracket holding said plate and springs spaced from said bar, said springs being under tension to hold said plate against substantial movement due to the movements of said trailer, the forward movement of said plate being limited by said rear bar of the vehicle in the path of said draw-bar.

3. In combination with the rear bar of a vehicle, brackets fixed to said rear bar, a plate having a sleeve therein for receiving the draw-bar of a trailer, coil springs at each said of said plate, said springs being attached at one end to said plate and at the other end to said brackets, said bracket holding said plate and springs spaced from said rear bar, said springs being under tension to hold said plate against substantial movement due to the movements of said trailer, the forward movement of said plate being limited by said rear bar, and safety chains for connecting the sides of the plate in the middle portion thereof to the said brackets to support said plate in position in case of failure of any of said springs.

In testimony whereof I have signed my name to this specification.

MARIUS JEAN BAPTISTE BARBAROU.